United States Patent
Schmalstieg et al.

(10) Patent No.: US 11,622,113 B2
(45) Date of Patent: Apr. 4, 2023

(54) IMAGE-SPACE FUNCTION TRANSMISSION

(71) Applicant: QUALCOMM Technologies, Inc., San Diego, CA (US)

(72) Inventors: Dieter Schmalstieg, Graz (AT); Pascal Stadlbauer, Graz (AT); Markus Steinberger, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/400,048

(22) Filed: Aug. 11, 2021

(65) Prior Publication Data

US 2022/0060708 A1 Feb. 24, 2022

Related U.S. Application Data

(60) Provisional application No. 63/067,123, filed on Aug. 18, 2020.

(51) Int. Cl.
| | |
|---|---|
| *H04N 19/00* | (2014.01) |
| *H04N 19/132* | (2014.01) |
| *H04N 19/176* | (2014.01) |
| *H04N 19/186* | (2014.01) |
| *H04N 19/119* | (2014.01) |

(52) U.S. Cl.
CPC ......... *H04N 19/132* (2014.11); *H04N 19/119* (2014.11); *H04N 19/176* (2014.11); *H04N 19/186* (2014.11)

(58) Field of Classification Search
CPC .. H04N 19/132; H04N 19/119; H04N 19/176; H04N 19/186
See application file for complete search history.

(56) References Cited

U.S. PATENT DOCUMENTS

| | | | | |
|---|---|---|---|---|
| 2016/0337650 A1* | 11/2016 | Alakuijala | ........... | H04N 19/186 |
| 2020/0269133 A1* | 8/2020 | Sun | ......................... | A63F 13/50 |

OTHER PUBLICATIONS

International Search Report and Written Opinion—PCT/US2021/045806—ISA/EPO—dated Apr. 7, 2022.
Lucas L., et al., "3D Video: From Capture to Diffusion", Jan. 1, 2013 (Jan. 1, 2013), John Wiley & Sons, Inc., Hoboken, NJ, USA, XP055862897, ISBN: 978-1-84821-507-8, pp. i-xxviii, 137-155, 194-247, pp. 195-210, 98 Pages, paragraph 10.1-paragraph10.5.

(Continued)

*Primary Examiner* — Zhihan Zhou
(74) *Attorney, Agent, or Firm* — Procopio, Cory, Hargreaves & Savitch LLP

(57) ABSTRACT

The present disclosure relates to methods and apparatus for graphics processing at a server and/or a client device. In some aspects, the apparatus may convert application data for at least one frame, the application data corresponding to one or more image functions or one or more data channels. The apparatus may also encode the application data for the at least one frame, the application data being associated with a data stream, the application data being encoded via a video encoding process. The apparatus may also transmit the encoded application data for the at least one frame. Additionally, the apparatus may receive application data for at least one frame, the application data being associated with a data stream. The apparatus may also decode the application data for the at least one frame; and convert the application data for the at least one frame.

23 Claims, 12 Drawing Sheets

(56) References Cited

OTHER PUBLICATIONS

"Test Model 5 for Immersive Video", 130. Mpeg Meeting, Apr. 20, 2020-Apr. 24, 2020, Alpbach, (Motion Picture Expert Group or ISO/IEC JTC1/SC29/WG11), No. n19213, May 17, 2020 (May 17, 2020), XP030285464, 35 Pages, Retrieved from the Internet: URL: http://phenix.int-evry.fr/mpeg/doc_end_user/documents/130_Alpbach/wg11/w19213.zip w19213.docx [retrieved on May 17, 2020] the whole document.

"Test Model 6 for MPEG Immersive Video", 131. Mpeg Meeting, Jun. 29, 2020-Jul. 3, 2020, Online, (Motion Picture Expert Group or ISO/IEC JTC1/SC29/WG11), No. n19483, Jul. 25, 2020 (Jul. 25, 2020), XP030288104, 39 Pages, Retrieved from the Internet: URL: http://phenix.int-evry.fr/mpeg/doc_end_user/documents/131_OnLine/wg11/w19483.zipw19483_TMIV6 .docx [retrieved on Jul. 25, 2020] the whole document.

"Working Draft 5 of Immersive Video", 130. Mpeg Meeting, Apr. 20, 2020-Apr. 24, 2020, Alpbach, (Motion Picture Expert Group or ISO/IEC JTC1/SC29/WG11), No. n19212, Jun. 9, 2020 (Jun. 9, 2020), XP030289551, Retrieved from the Internet: URL: http://phenix.int-evry.tr/mpeg/doc_end_user/documents/130_Alpbach/wg11/w19212.zipMIV_WD5_d12_clean.docx [retrieved on Jun. 9, 2020] pp. 36-40, 66 Pages, paragraph F.3.1-paragraph F.3.1.5.

\* cited by examiner

IMAGE-SPACE FUNCTION TRANSMISSION

CROSS REFERENCE TO RELATED APPLICATION(S)

This application claims the benefit of U.S. Provisional Application Ser. No. 63/067,123, entitled "METHODS AND APPARATUS FOR IMAGE-SPACE FUNCTION TRANSMISSION" and filed on Aug. 18, 2020, which is expressly incorporated by reference herein in its entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

BRIEF SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a server, a client device, a central processing unit (CPU), a graphics processing unit (GPU), or any apparatus that may perform graphics processing. The apparatus may generate application data for at least one frame. The apparatus may also convert application data for at least one frame, the application data corresponding to one or more image functions or one or more data channels. The apparatus may also encode the application data for the at least one frame, the application data being associated with a data stream, the application data being encoded via a video encoding process. Additionally, the apparatus may allocate the encoded application data to one or more video frames or one or more MPEG frames. The apparatus may also store the encoded application data in the one or more video frames or the one or more MPEG frames. Further, the apparatus may divide the one or more video frames into at least one sub-area associated with color data or at least one other sub-area associated with the application data. The apparatus may also transmit the encoded application data for the at least one frame.

In another aspect of the disclosure, a method, a computer-readable medium, and an apparatus are provided. The apparatus may be a server, a client device, a central processing unit (CPU), a graphics processing unit (GPU), or any apparatus that may perform graphics processing. The apparatus may receive application data for at least one frame, the application data being associated with a data stream. The apparatus may also decode the application data for the at least one frame, the application data being decoded via a video decoding process. The apparatus may also convert the application data for the at least one frame, the converted application data corresponding to one or more image functions or one or more data channels. Moreover, the apparatus may display the application data for the at least one frame at a display panel.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
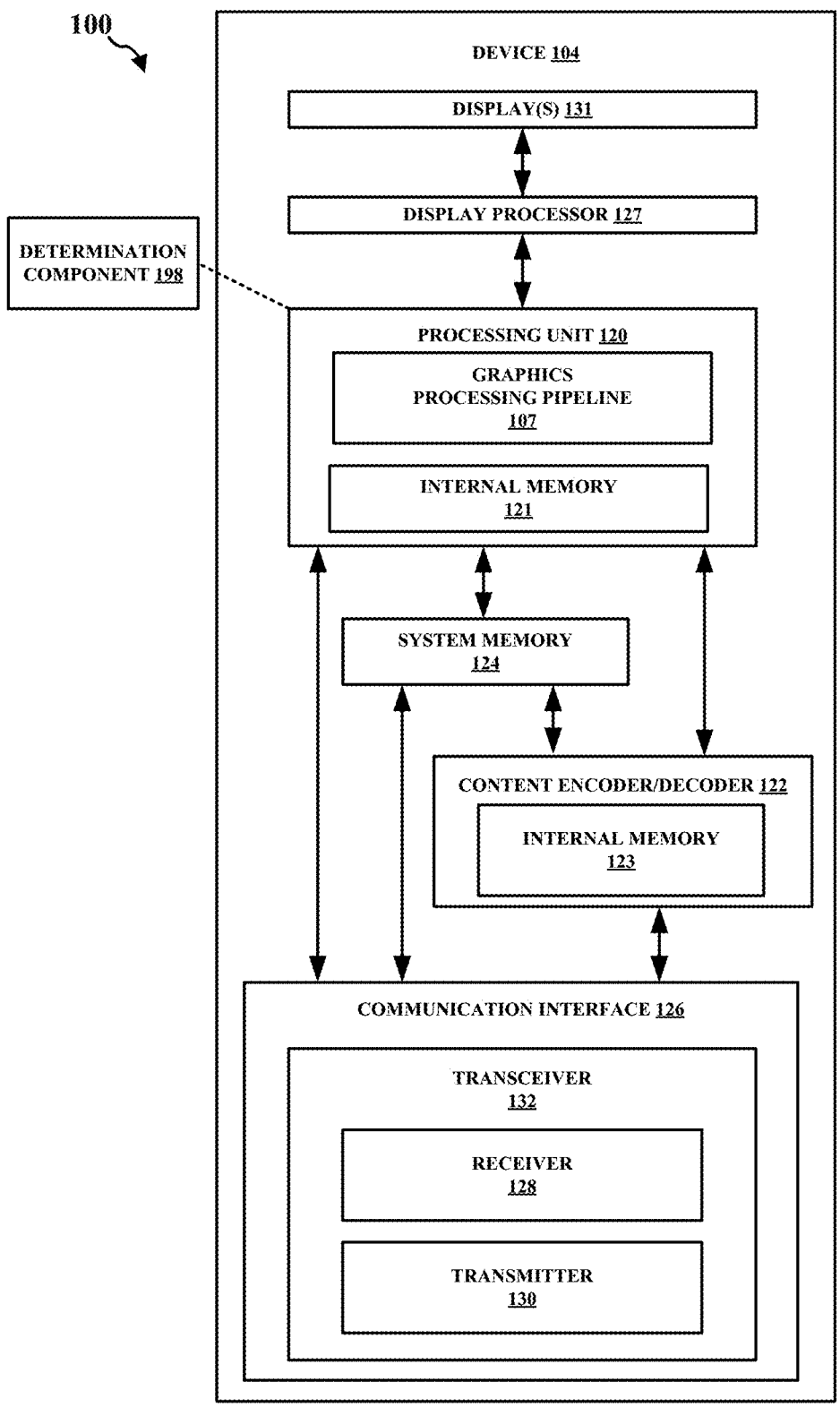
FIG. 1 is a block diagram that illustrates an example content generation system in accordance with one or more techniques of this disclosure.

In some aspects of split rendering, the rendering may be performed using red (R), green (G), blue (B) (RGB) color data. A hardware video encoder may transform RGB color data to luminance (Y) chrominance (UV) (YUV) color data. To use hardware, auxiliary data (AuxD) may be provided as RGB color data, and be transported as YUV color data. In some instances, certain YUV color data, e.g., YUV4:2:0, may contain a portion of the data, e.g., half of the data, compared to RGB color data, e.g., RGB4:4:4. The Y portion of the data may be transmitted in full resolution, and the U and V portions may be down-sampled by a factor of 2, which may result in ¼ of the resolution. Aspects of the present disclosure may encode AuxD such that it may be restored to a known precision after a lossy transformation. Aspects of the present disclosure may also convert and encode RGB color data to YUV color data, and then transmit the YUV color data in split rendering. Additionally, aspects of the present disclosure may receive the YUV color data in split rendering, and then decode and convert the YUV color data back to RGB color data.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "products of 3D graphics design," their rendition, i.e., "images," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example system 100 configured to implement one or more techniques of this disclosure. The system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to generate application data for at least one frame. The determination component 198 may also be configured to convert application data for at least one frame, the application data corresponding to one or more image functions or one or more data channels. The determination component 198 may also be configured to encode the application data for the at least one frame, the application data being associated with a data stream, the application data being encoded via a video encoding process. The determination component 198 may also be configured to allocate the encoded application data to one or more video frames or one or more MPEG frames. The determination component 198 may also be configured to store the encoded application data in the one or more video frames or the one or more MPEG frames. The determination component 198 may also be configured to divide the one or more video frames into at least one sub-area associated with color data or at least one other sub-area associated with the application data. The determination component 198 may also be configured to transmit the encoded application data for the at least one frame.

Referring again to FIG. 1, in certain aspects, the processing unit 120 may include a determination component 198 configured to receive application data for at least one frame, the application data being associated with a data stream. The determination component 198 may also be configured to decode the application data for the at least one frame, the application data being decoded via a video decoding process. The determination component 198 may also be configured to convert the application data for the at least one frame, the converted application data corresponding to one or more image functions or one or more data channels. The determination component 198 may also be configured to display the application data for the at least one frame at a display panel.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

GPUs may render images in a variety of different ways. In some instances, GPUs may render an image using rendering or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. Moreover, in the binning pass, different primitives may be shaded in certain bins, e.g., using draw calls. In some aspects, during the binning pass, a visibility stream may be constructed where visible primitives or draw calls may be identified.

In some aspects of rendering, there may be multiple processing phases or passes. For instance, the rendering may be performed in two passes, e.g., a visibility pass and a rendering pass. During a visibility pass, a GPU may input a rendering workload, record the positions of primitives or triangles, and then determine which primitives or triangles fall into which portion of a frame. In some aspects of a visibility pass, GPUs may also identify or mark the visibility of each primitive or triangle in a visibility stream. During a rendering pass, a GPU may input the visibility stream and process one portion of a frame at a time. In some aspects, the visibility stream may be analyzed to determine which primitives are visible or not visible. As such, the primitives that are visible may be processed. By doing so, GPUs may reduce the unnecessary workload of processing or rendering primitives that are not visible.

In some aspects, rendering may be performed in multiple locations and/or on multiple devices, e.g., in order to divide the rendering workload between different devices. For example, the rendering may be split between a server and a client device, which may be referred to as "split rendering." In some instances, split rendering may be a method for bringing content to user devices or head mounted displays (HMDs), where a portion of the graphics processing may be performed outside of the device or HMD, e.g., at a server.

Split rendering may be performed for a number of different types of applications, e.g., virtual reality (VR) applications, augmented reality (AR) applications, and/or extended reality (XR) applications. In VR applications, the content displayed at the user device may correspond to man-made or animated content. In AR or XR content, a portion of the content displayed at the user device may correspond to real-world content, e.g., objects in the real world, and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa.

Split XR or AR systems may also introduce latency when delivering the rendered content to the client display. In some aspects, this latency may be even higher when rendering occurs on a server than compared to client rendering, but it may also enable more complex XR or AR applications. In addition, there may be non-negligible latency between the time a pose of the client device is computed and the time the content appears on the client display. For instance, a certain amount of latency may be present in split XR or AR systems.

Figure 2:
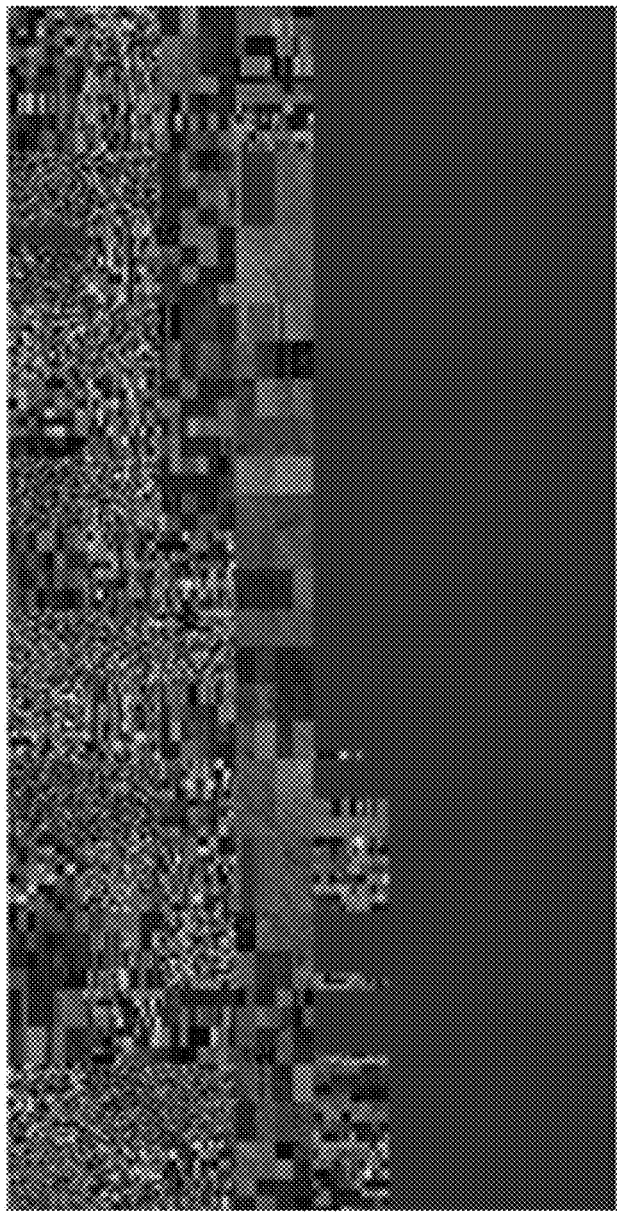
FIG. 2 illustrates an example of a shading atlas in accordance with one or more techniques of this disclosure.

FIG. 2 illustrates shading atlas 200 in accordance with one or more techniques of this disclosure. Some aspects of graphics processing may utilize shading atlas streaming, such as via shading atlas 200 in FIG. 2. In some instances, shading atlas streaming may also be referred to as vector streaming. Shading atlas streaming may dynamically chart patches of primitives into a texture atlas. Shading atlas streaming may also patch a number of primitives or triangles, e.g., one (1) to three (3) primitives or triangles, assigned to a rectangle in an atlas.

In split rendering applications, a server may compute shading information in a shading atlas. The shading atlas may be encoded, e.g., moving picture experts group (MPEG) encoded, and streamed to a client device, e.g., a standalone head mounted display (HMD). The client device may render final views at a higher frame rate. Additionally, shading may be sampled from a shading atlas. As a user moves their head, novel views may be rendered. These novel views may use a newest atlas frame available at the client device.

Some aspects of split rendering may include auxiliary data (AuxD) in streaming rendering. AuxD may be provided as an image-space function, e.g., transparency, depth, and/or high-dynamic range exponents. AuxD may also be utilized for a portion of an original video stream. In some aspects, AuxD may not use extended MPEG data, e.g., red (R), green (G), blue (B) (RGB), alpha (RGBA) data, since hardware supported for MPEG data may work with 3-channel video, e.g., YUV4:2:0.

In some aspects of split rendering, the rendering may be performed using RGB color data. A hardware video encoder may transform RGB color data to luminance (Y) chrominance (UV) (YUV) color data. In order to utilize certain types of hardware, AuxD may be provided as RGB color data. Also, AuxD may be transported as YUV color data. In some instances, certain YUV color data, e.g., YUV4:2:0, may contain a portion of the data, e.g., half of the data, compared to RGB color data, e.g., RGB4:4:4. For example, the Y portion of the data may be transmitted in full resolution, and the U and V portions may include a resolution that is down-sampled by a certain factor, e.g., a factor of 2. This may result in a fraction of the resolution being transmitted, e.g., ¼ of the resolution.

Based on the above, it may be beneficial to encode auxiliary data (AuxD) such that it may be restored to a known precision after a lossy transformation. For instance, it may be beneficial to convert and encode AuxD data to YUV color data, and then transmit the YUV color data in split rendering. It may also be beneficial receive the YUV color data in split rendering. Further, it may be beneficial to decode and convert the YUV color data back to AuxD data.

Aspects of the present disclosure may encode AuxD such that it may be restored to a known precision after a lossy transformation. Aspects of the present disclosure may also convert and encode AuxD data to YUV color data, and then transmit the YUV color data in split rendering. Additionally, aspects of the present disclosure may receive the YUV color data in split rendering. Aspects of the present disclosure may also decode and convert the YUV color data back to AuxD color data.

Figure 3:
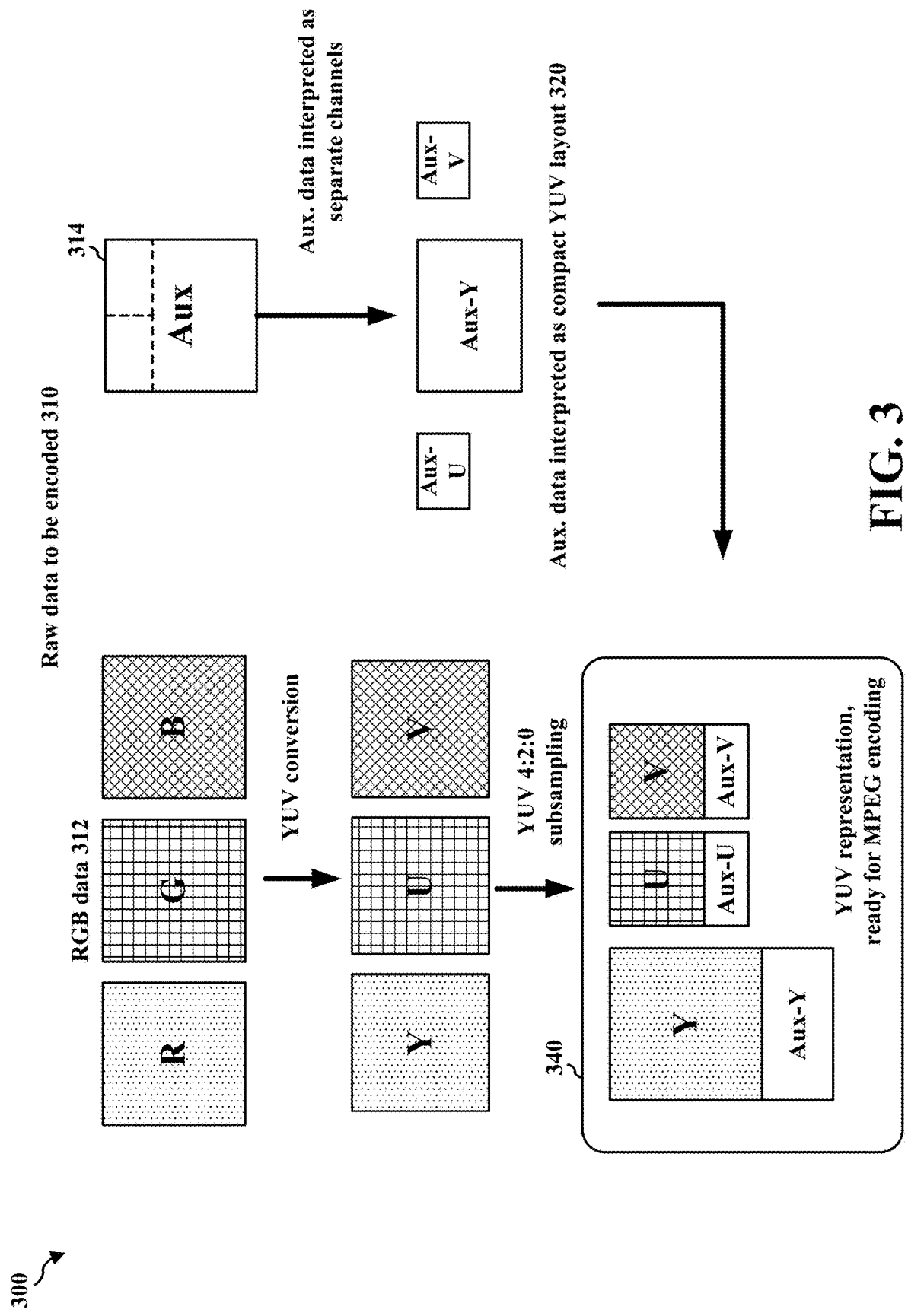
FIG. 3 illustrates a diagram of an example data encoding process in accordance with one or more techniques of this disclosure.

FIG. 3 illustrates diagram 300 of an example data encoding process in accordance with one or more techniques of this disclosure. Diagram 300 in FIG. 3 includes raw data 310 including RGB data 312 and auxiliary data 314. Diagram 300 also includes compact YUV data layout 320, and final YUV representation 340. As shown in FIG. 3, RGB data 312 may be encoded at a server. Then auxiliary data 314 may be interpreted as compact YUV data layout 320. These steps may result in a final YUV representation 340, which may be ready for MPEG encoding. In some instances, the steps in FIG. 3 may be performed by a server.

As displayed in FIG. 3, aspects of the present disclosure may include an example of encoding a full-frame auxiliary channel. Aspects of the present disclosure may also interpret an auxiliary channel as a compact YUV4:2:0 layout. Aspects of the present disclosure may also convert a YUV layout to RGB color data, or vice versa. Moreover, aspects of the present disclosure may interleave an auxiliary RGB representation with regular RGB data, or an auxiliary YUV representation with regular YUV data. Aspects of the present disclosure may also submit the YUV representation/data to MPEG encoding.

Figure 4:
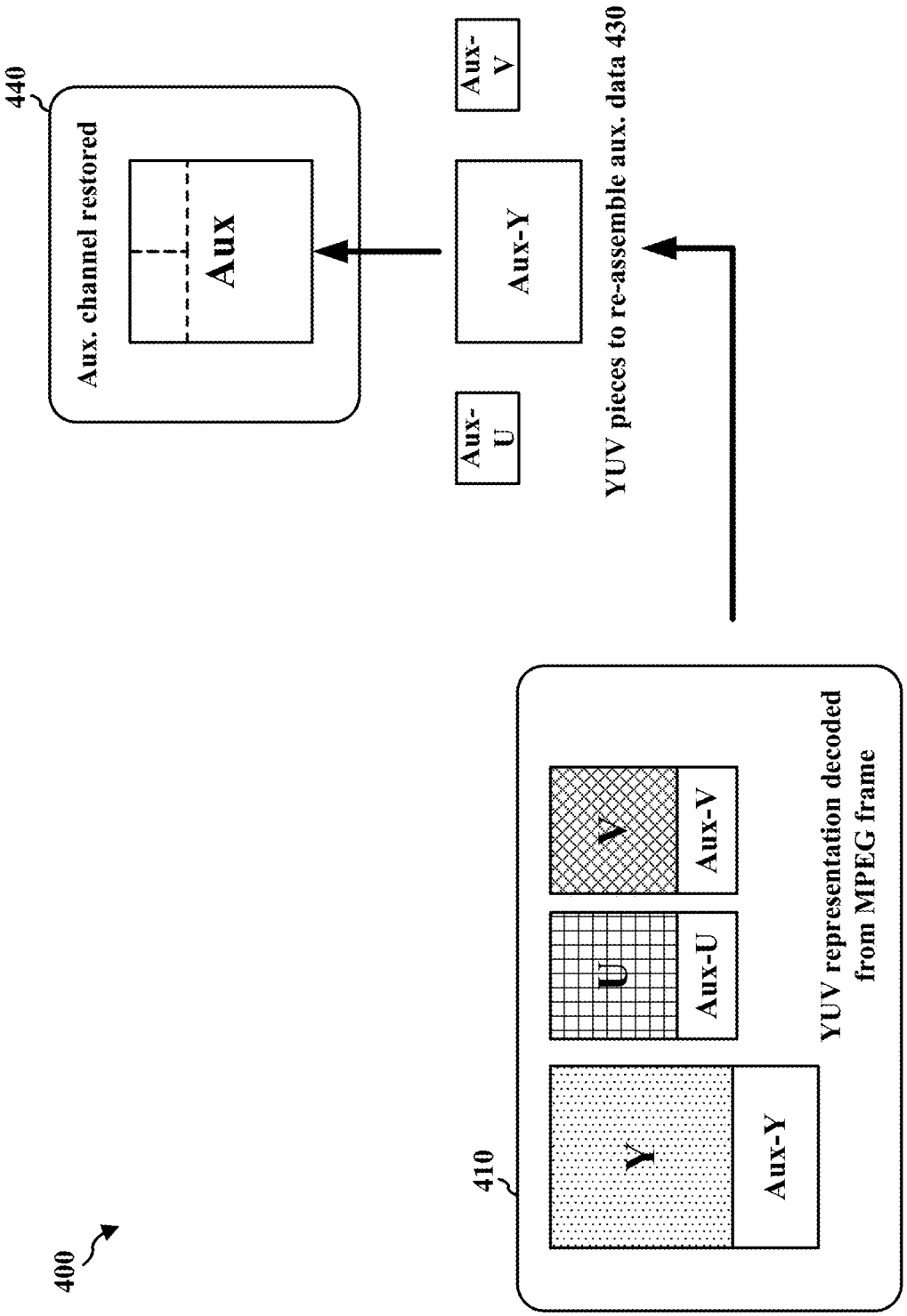
FIG. 4 illustrates a diagram of an example data decoding process in accordance with one or more techniques of this disclosure.

FIG. 4 illustrates diagram 400 of an example data decoding process in accordance with one or more techniques of this disclosure. Diagram 400 in FIG. 4 includes YUV representation 410, YUV color data 430 (i.e., compact YUV layout or YUV pieces), and auxiliary channel 440. As shown in FIG. 4, a client device may invert the steps performed on the server in FIG. 3. The client device may decode an MPEG frame to YUV data, which may result in YUV representation 410. Also, the client device may convert an auxiliary-YUV representation to YUV color data 430. The client device may then re-assemble an auxiliary channel 440 from YUV color data 430. By doing so, the auxiliary channel 440 may be restored.

Aspects of the present disclosure may also reduce or prevent information loss during a YUV color data conversion. As described herein, the previous encoding steps may compensate for YUV subsampling. MPEG encoding may be lossy, e.g., due to a quantization in a discrete cosine transform (DCT) domain. In some aspects, AuxD may lose a certain number of bits, e.g., 1 to 2 bits, of precision for an 8-bit input channel. Also, the monotonicity of the function may be preserved. In some instances, the loss may be acceptable, e.g., for alpha buffers. Also, aspects of the present disclosure may condition the AuxD with a nonlinear transformation, e.g., a gamma curve, before transforming it in order to obtain improved results.

Figure 5:
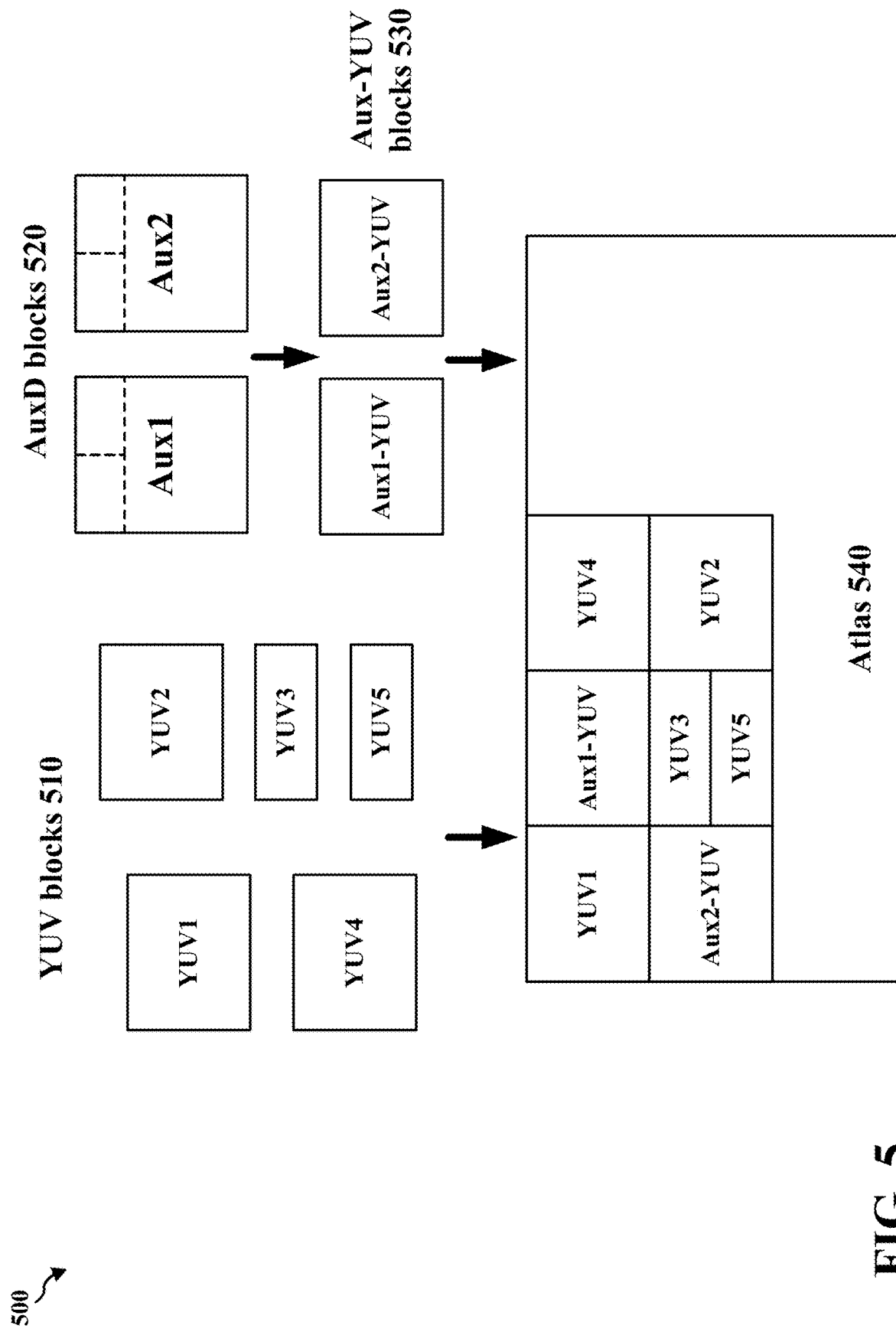
FIG. 5 illustrates a diagram of an example data allocation process in accordance with one or more techniques of this disclosure.

FIG. 5 illustrates diagram 500 of an example data allocation process in accordance with one or more techniques of this disclosure. Diagram 500 in FIG. 5 includes YUV blocks 510 (e.g., YUV1, YUV2, YUV3, YUV4, and YUV5), AuxD blocks 520 (e.g., Aux1 and Aux2), Aux-YUV blocks 530 (e.g., Aux1-YUV and Aux2-YUV), and atlas 540. As shown in FIG. 5, aspects of the present disclosure may include block-wise auxiliary data in a texture atlas, e.g., atlas 540. For instance, a texture atlas, e.g., atlas 540, may assemble YUV blocks 510 (rectangular pixel arrays) into an image container. The image container may be hardware MPEG encoded. If AuxD is included in blocks (e.g., AuxD blocks 520), aspects of the present disclosure may mix AuxD blocks 520 with YUV blocks 510 in the same atlas, e.g., atlas 540. Moreover, YUV blocks 510 may be directly inserted into the atlas 540. As shown in FIG. 4, AuxD blocks 520 may be transformed to Aux-YUV blocks 530 (such as for full AuxD frames) before insertion into the atlas 540.

Figure 6:
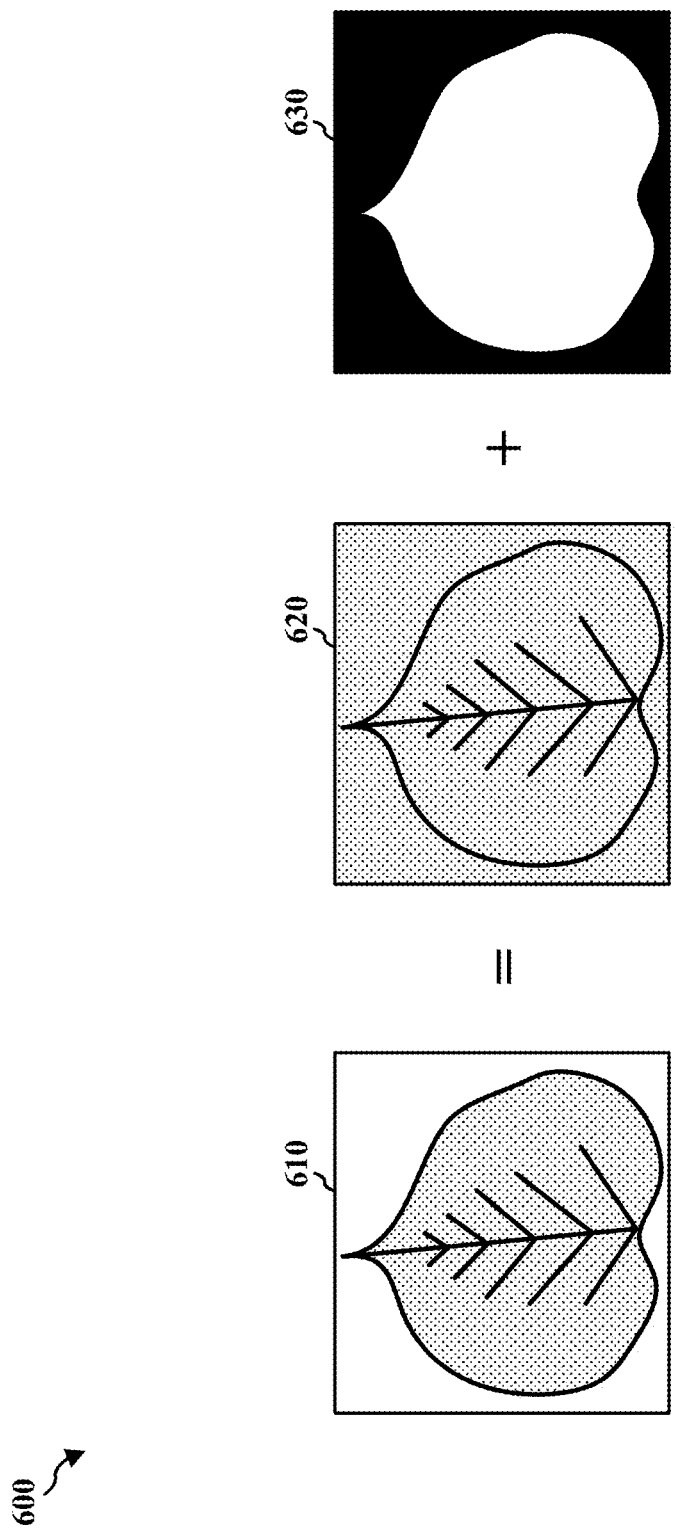
FIG. 6 illustrates a diagram of an example data allocation process in accordance with one or more techniques of this disclosure.

FIG. 6 illustrates diagram 600 of an example data allocation process in accordance with one or more techniques of this disclosure. Diagram 600 in FIG. 6 includes RGBA block 610, RGB block 620, and alpha block 630, each of which may be associated with a certain image, e.g., an image of a leaf. As shown in FIG. 6, aspects of the present disclosure may include block-wise allocation. In some instances, additional image functions may be allocated for each block in an atlas. For instance, RGBA may be split into RGB+alpha, e.g., RGBA block 610 may be split into RGB block 620 and alpha block 630. In some aspects, alpha may be included in separate AuxD blocks in the atlas. In some instances, if alpha is equal to one (1) for an entire RGBA block, the AuxD block may not be created.

Figure 7:
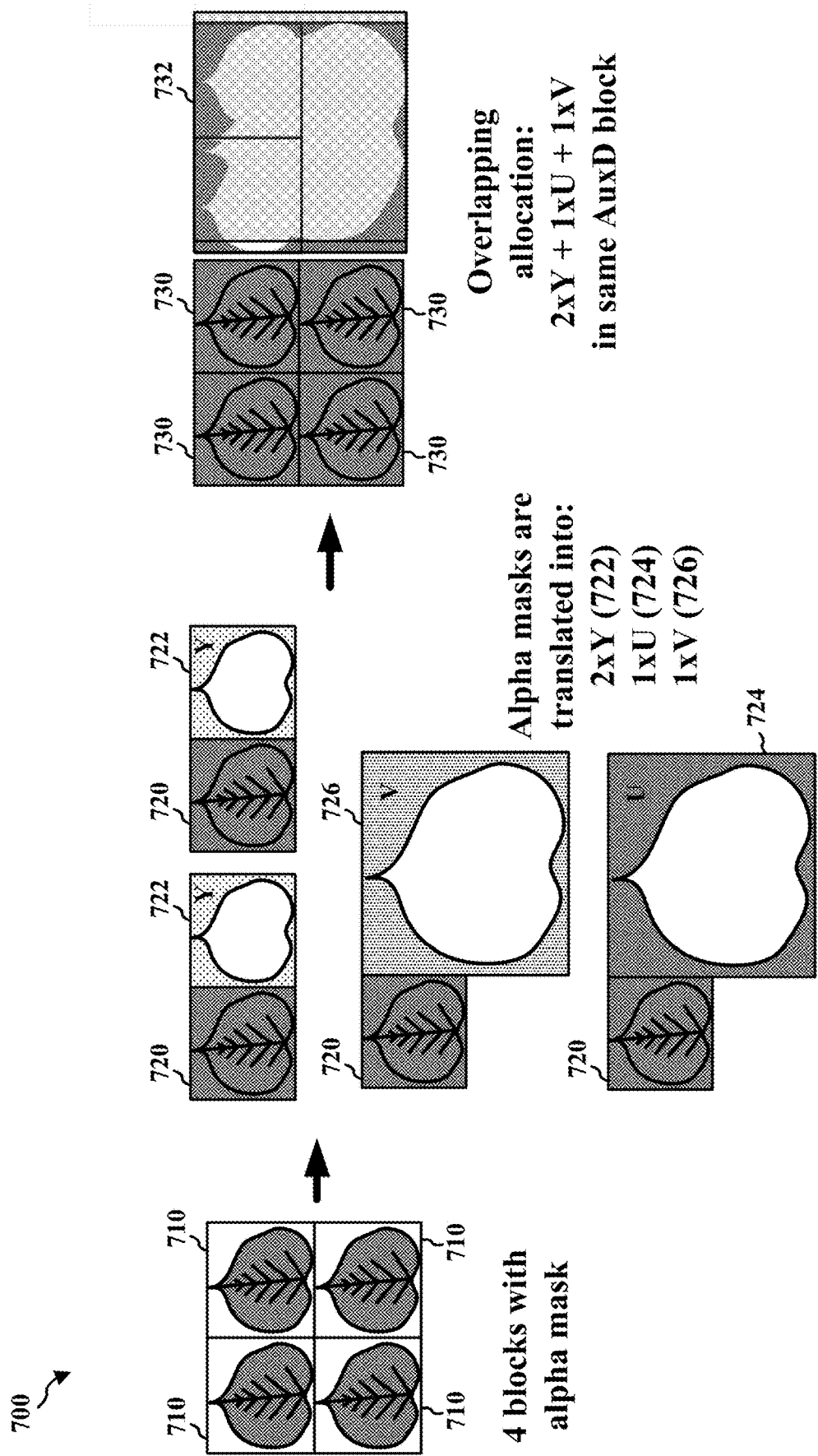
FIG. 7 illustrates a diagram of an example data allocation process in accordance with one or more techniques of this disclosure.

FIG. 7 illustrates diagram 700 of an example data allocation process in accordance with one or more techniques of this disclosure. Diagram 700 in FIG. 7 includes alpha masks 710, alpha masks 720, Y blocks 722, U block 724, V block 726, alpha masks 730, and overlapping allocation 732. FIG. 7 shows an example of block-wise allocation. As shown in FIG. 7, in block-wise allocation, aspects of the present disclosure may include four (4) blocks with an alpha mask. As shown in FIG. 7, alpha masks 710 may be translated into Y blocks 722 (e.g., original size), U block 724 (e.g., 4 times the original size), and V block 726 (e.g., 4 times the original size) of different sizes to compensate for subsampling. Aspects of the present disclosure may use an overlapping allocation of the Y, U, V blocks in the atlas, e.g., 2×Y+1× U+1×V, in the same atlas block. For example, overlapping allocation 732 may include two (2) Y blocks 722, one (1) U block 724, and one (1) V block 726.

Aspects of the present disclosure may also include a parallel block allocation. In some aspects, AuxD block allocation may extend the existing block allocation in an atlas. This allocation may run in parallel on the GPU, e.g., in a compute shader. First, aspects of the present disclosure may determine how many AuxD blocks are utilized. AuxD blocks may be placed in different channels, and may result in partially filled atlas blocks. For instance, a partially filled block may be filled up before a new AuxD block is allocated. Some amount of blocks, e.g., ⅓ of the blocks, may be provided by allocating a larger block, e.g., a 4× larger block, and may use the U channel or the V channel. Also, some amount of blocks, e.g., ⅔ of the blocks, may be provided by allocating blocks of the same size as input AuxD and use the Y channel. After determining how many blocks may be utilized, aspects of the present disclosure may use the existing allocation strategy of vector streaming.

Aspects of the present disclosure may also include a number of usage examples. For example, aspects of the present disclosure may include a smooth transparency function, e.g., windows, water, fog, fire, rain, decals, etc. Aspects of the present disclosure may include a hard alpha mask, e.g., foliage. Additionally, aspects of the present disclosure may include depth values, which may enable selective depth-based warping. Further, aspects of the present disclosure may include a brightness multiplicator, which may enable high dynamic range (HDR) streaming for areas with high dynamic range.

In some aspects of the present disclosure, any number of AuxD blocks may be combined in a block wise allocation strategy. For example, there may be transparency in some blocks, depth in other blocks, an alpha mask in other blocks, and HDR in other blocks. Also, the AuxD blocks may be combined in one atlas block within different channels.

Aspects of the present disclosure may include a system to transmit additional image functions or data channels embedded directly in an MPEG stream. Aspects of the present disclosure may also include a system that uses encoding or decoding hardware based on subsampled channels, such as YUV4:2:0, to encode multiple full resolution functions with minimum space. Additionally, aspects of the present disclosure may include a system that transmits additional image functions for a subset of the full frame. Aspects of the present disclosure may also include a system that performs block-wise allocation of video frames (similar to a texture atlas) and store the additional information compactly in encoded video frames. Aspects of the present disclosure may also include a system that performs efficient parallel block allocation of sub samples blocks, e.g., using size-based heuristics.

Figure 8:
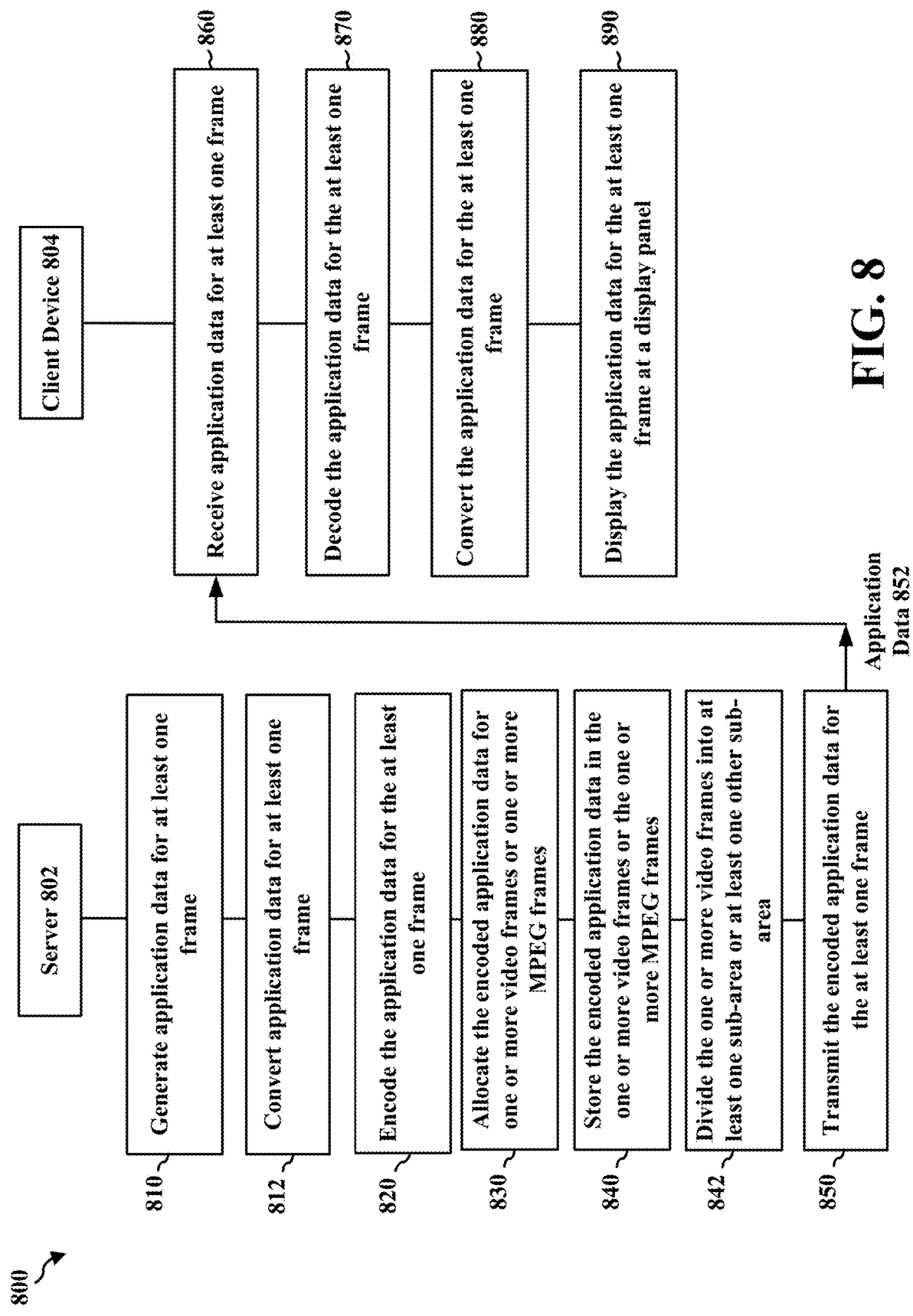
FIG. 8 is a communication flow diagram illustrating example communications between components in accordance with one or more techniques of this disclosure.

FIG. 8 is a communication flow diagram 800 of graphics processing in accordance with one or more techniques of this disclosure. As shown in FIG. 8, diagram 800 includes example communications between server 802 and client device 804, e.g., a headset or HMD, in accordance with one or more techniques of this disclosure.

At 810, server 802 may generate application data for at least one frame. In some aspects, generating the application data for the at least one frame may include rendering the application data for the at least one frame, e.g., server 802 may render the application data for the at least one frame. The application data may correspond to a group of values or a multi-variate function. The application data may be associated with a subset of the at least one frame.

At 812, server 802 may convert application data for at least one frame, the application data corresponding to one or more image functions or one or more data channels. The one or more image functions may correspond to one or more two-dimensional (2D) image functions. Also, each of the one or more image functions may include a plurality of pixels, and each of the plurality of pixels may include one or more function values. The one or more function values may include at least one of: one or more depth values, one or more texture one or more values, texture coordinates, one or more transparency values, one or more screen masks, one or more normal vectors, one or more primitive identifiers (IDs), one or more global coordinate positions, or one or more displacement maps.

At 820, server 802 may encode the application data for the at least one frame, the application data being associated with a data stream, the application data being encoded via a video encoding process. In some aspects, encoding the application data for the at least one frame may include subsampling the application data for the at least one frame, e.g., server 802 may subsample the application data for the at least one frame. The application data may be subsampled based on one or more subsampled channels, where at least one of the one or more subsampled channels may be a luminance (Y) chrominance (UV) (YUV) channel. Also, the data stream may be a moving picture experts group (MPEG) stream or a video stream. Further, the video encoding process may include moving picture experts group (MPEG) encoding.

At 830, server 802 may allocate the encoded application data to one or more video frames or one or more MPEG frames. The encoded application data may be block-wise allocated or may be parallel block allocated for the one or more video frames.

At 840, server 802 may store the encoded application data in the one or more video frames or the one or more MPEG frames.

At 842, server 802 may divide the one or more video frames into at least one sub-area associated with color data or at least one other sub-area associated with the application data.

At 850, server 802 may transmit the encoded application data for the at least one frame, e.g., application data 852. The application data may be red (R), green (G), blue (B) (RGB) color data before being converted, and the application data may be luminance (Y) chrominance (UV) (YUV) color data after being encoded.

At 860, client device 804 may receive application data for at least one frame, e.g., application data 852, where the application data may be associated with a data stream. The application data may correspond to a group of values or a multi-variate function. Also, the application data may be associated with a subset of the at least one frame. The data stream may be a moving picture experts group (MPEG) stream.

At 870, client device 804 may decode the application data for the at least one frame, the application data being decoded via a video decoding process. In some aspects, decoding the application data for the at least one frame may include reverse subsampling the application data for the at least one frame, e.g., client device 804 may reverse subsample the application data for the at least one frame. The application data may be reverse subsampled based on one or more subsampled channels, where at least one of the one or more sub sampled channels may be a luminance (Y) chrominance (UV) (YUV) channel. The video decoding process may include moving picture experts group (MPEG) decoding.

In some aspects, the decoded application data may be allocated for one or more video frames. Also, the decoded application data may be stored in the one or more video frames. The decoded application data may be block-wise allocated or may be parallel block allocated for the one or more video frames. The one or more video frames may be divided into at least one sub-area associated with color data or at least one other sub-area associated with the application data.

At 880, client device 804 may convert the application data for the at least one frame, the converted application data corresponding to one or more image functions or one or more data channels. The application data may be luminance (Y) chrominance (UV) (YUV) color data before being decoded, and the application data may be red (R), green (G), blue (B) (RGB) color data after being converted. The one or more image functions may correspond to one or more two-dimensional (2D) image functions. Also, each of the one or more image functions may include a plurality of pixels, and each of the plurality of pixels may include one or more function values. The one or more function values may include at least one of: one or more depth values, one or more texture values, one or more texture coordinates, one or more transparency values, one or more screen masks, one or more normal vectors, one or more primitive identifiers (IDs), one or more global coordinate positions, or one or more displacement maps.

At 890, client device 804 may display the application data for the at least one frame at a display panel.

Figure 9:
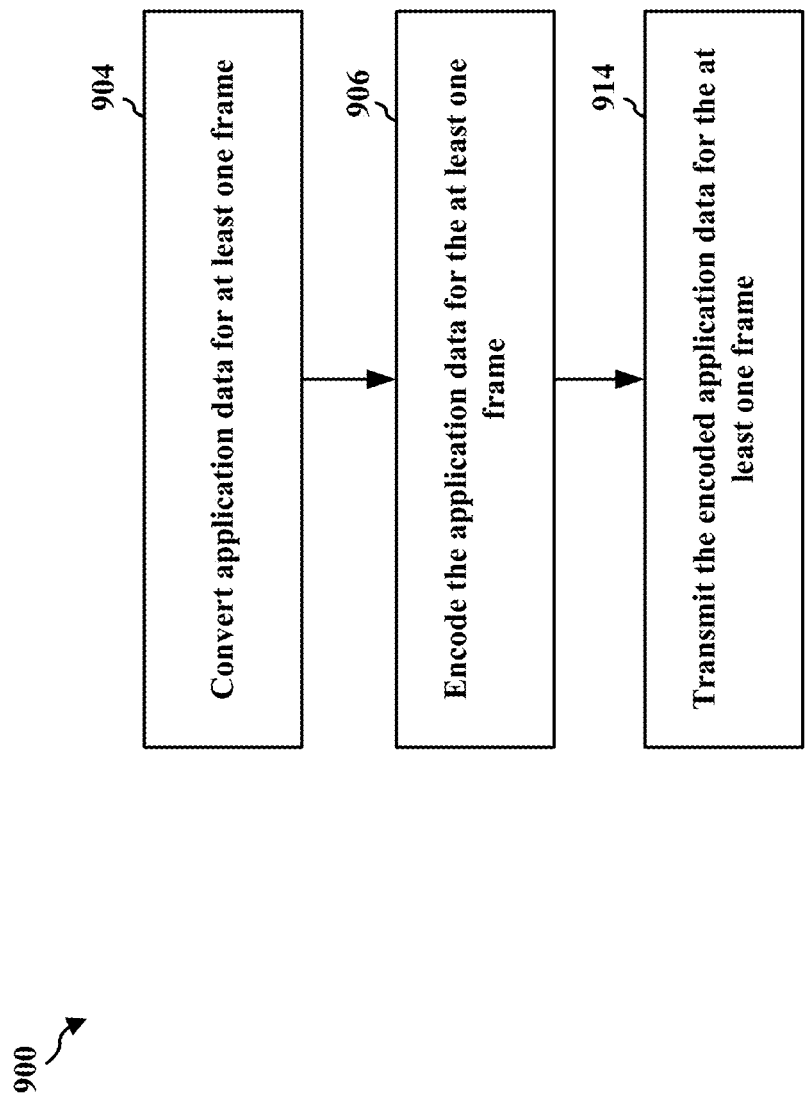
FIG. 9 illustrates an example flowchart of an example method in accordance with one or more techniques of this disclosure.

FIG. 9 illustrates an example flowchart 900 of an example method in accordance with one or more techniques of this disclosure. The method may be performed by an apparatus such as a server, a client device, a CPU, a GPU, or an apparatus for graphics processing.

At 904, the apparatus may convert application data for at least one frame, the application data corresponding to one or more image functions or one or more data channels, as described in connection with the examples in FIGS. 2-8. For example, server 802 may convert application data for at least one frame, the application data corresponding to one or more image functions or one or more data channels, as described in 812 of FIG. 8. Further, processing unit 120 in FIG. 1 may perform step 904. The one or more image functions may correspond to one or more two-dimensional (2D) image functions. Also, each of the one or more image functions may include a plurality of pixels, and each of the plurality of pixels may include one or more function values. The one or more function values may include at least one of: one or more depth values, one or more texture one or more values, texture coordinates, one or more transparency values, one or more screen masks, one or more normal vectors, one or more primitive identifiers (IDs), one or more global coordinate positions, or one or more displacement maps. The application data may correspond to a group of values or a multi-variate function. The application data may be associated with a subset of the at least one frame.

At 906, the apparatus may encode the application data for the at least one frame, the application data being associated with a data stream, the application data being encoded via a video encoding process, as described in connection with the examples in FIGS. 2-8. For example, server 802 may encode the application data for the at least one frame, the application data being associated with a data stream, the application data being encoded via a video encoding process, as described in 820 of FIG. 8. Further, processing unit 120 in FIG. 1 may perform step 906. In some aspects, encoding the application data for the at least one frame may include subsampling the application data for the at least one frame, e.g., the apparatus may subsample the application data for the at least one frame. The application data may be subsampled based on one or more subsampled channels, where at least one of the one or more subsampled channels may be a luminance (Y) chrominance (UV) (YUV) channel. Also, the data stream may be a moving picture experts group (MPEG) stream or a video stream. Further, the video encoding process may include moving picture experts group (MPEG) encoding.

At 914, the apparatus may transmit the encoded application data for the at least one frame, as described in connection with the examples in FIGS. 2-8. For example, server 802 may transmit the encoded application data for the at least one frame, as described in 850 of FIG. 8. Further, processing unit 120 in FIG. 1 may perform step 914. The application data may be red (R), green (G), blue (B) (RGB) color data before being converted, and the application data may be luminance (Y) chrominance (UV) (YUV) color data after being encoded.

Figure 10:
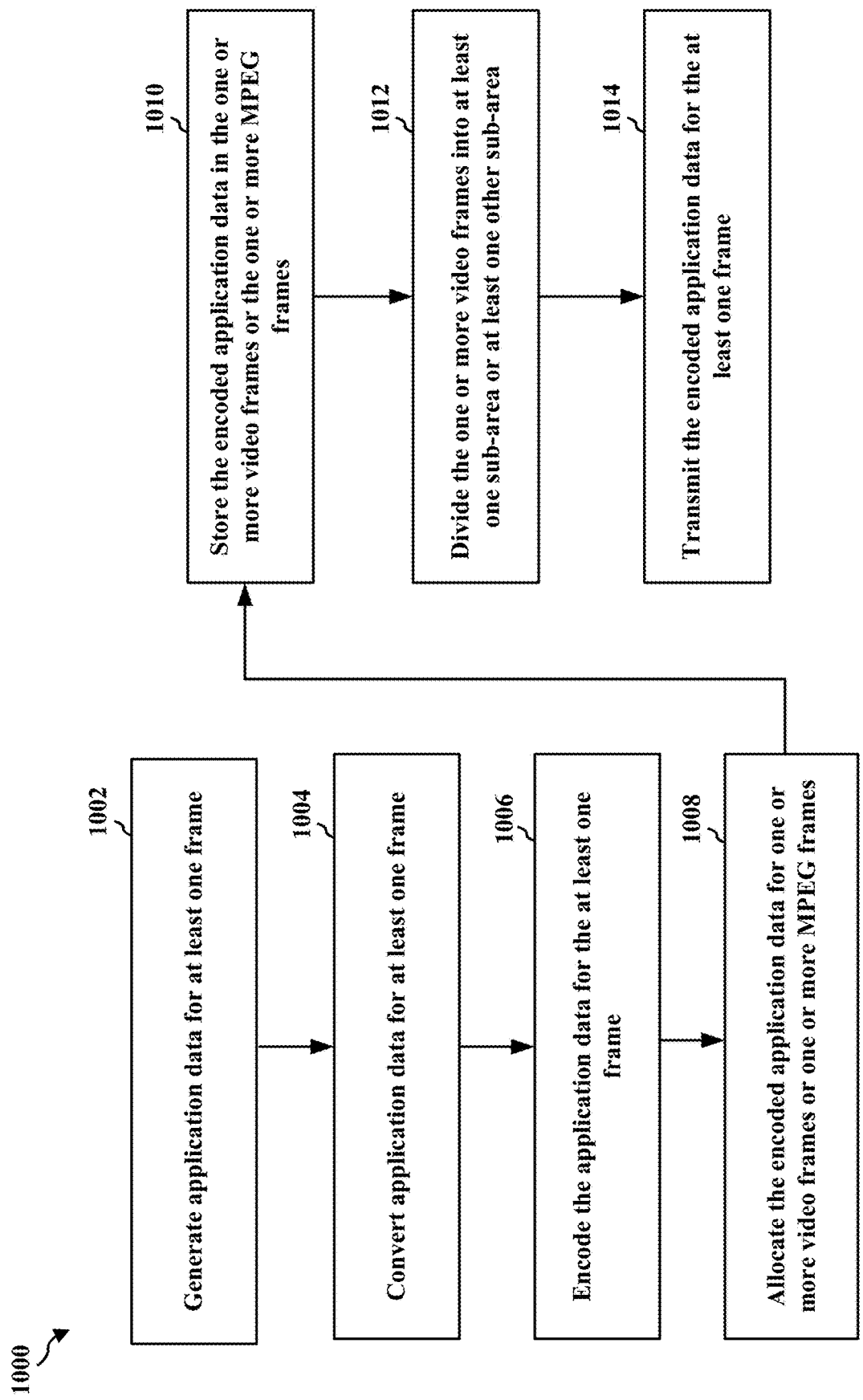
FIG. 10 illustrates an example flowchart of an example method in accordance with one or more techniques of this disclosure.

FIG. 10 illustrates an example flowchart 1000 of an example method in accordance with one or more techniques of this disclosure. The method may be performed by an apparatus such as a server, a client device, a CPU, a GPU, or an apparatus for graphics processing.

At 1002, the apparatus may generate application data for at least one frame, as described in connection with the examples in FIGS. 2-8. For example, server 802 may generate application data for at least one frame, as described in 810 of FIG. 8. Further, processing unit 120 in FIG. 1 may perform step 1002. In some aspects, generating the application data for the at least one frame may include rendering the application data for the at least one frame, e.g., the apparatus may render the application data for the at least one frame. The application data may correspond to a group of values or a multi-variate function. The application data may be associated with a subset of the at least one frame.

At 1004, the apparatus may convert application data for at least one frame, the application data corresponding to one or more image functions or one or more data channels, as described in connection with the examples in FIGS. 2-8. For example, server 802 may convert application data for at least one frame, the application data corresponding to one or more image functions or one or more data channels, as described in 812 of FIG. 8. Further, processing unit 120 in FIG. 1 may perform step 1004. The one or more image functions may correspond to one or more two-dimensional (2D) image functions. Also, each of the one or more image functions may include a plurality of pixels, and each of the plurality of pixels may include one or more function values. The one or more function values may include at least one of: one or more depth values, one or more texture one or more values, texture coordinates, one or more transparency values, one or more screen masks, one or more normal vectors, one or more primitive identifiers (IDs), one or more global coordinate positions, or one or more displacement maps.

At 1006, the apparatus may encode the application data for the at least one frame, the application data being associated with a data stream, the application data being encoded via a video encoding process, as described in connection with the examples in FIGS. 2-8. For example, server 802 may encode the application data for the at least one frame, the application data being associated with a data stream, the application data being encoded via a video encoding process, as described in 820 of FIG. 8. Further, processing unit 120 in FIG. 1 may perform step 1006. In some aspects, encoding the application data for the at least one frame may include subsampling the application data for the at least one frame, e.g., the apparatus may subsample the application data for the at least one frame. The application data may be subsampled based on one or more subsampled channels, where at least one of the one or more subsampled channels may be a luminance (Y) chrominance (UV) (YUV) channel. Also, the data stream may be a moving picture experts group (MPEG) stream or a video stream. Further, the video encoding process may include moving picture experts group (MPEG) encoding.

At 1008, the apparatus may allocate the encoded application data to one or more video frames or one or more MPEG frames, as described in connection with the examples in FIGS. 2-8. For example, server 802 may allocate the encoded application data to one or more video frames or one or more MPEG frames, as described in 830 of FIG. 8. Further, processing unit 120 in FIG. 1 may perform step 1008. The encoded application data may be block-wise allocated or may be parallel block allocated for the one or more video frames.

At 1010, the apparatus may store the encoded application data in the one or more video frames or the one or more MPEG frames, as described in connection with the examples in FIGS. 2-8. For example, server 802 may store the encoded application data in the one or more video frames or the one or more MPEG frames, as described in 840 of FIG. 8. Further, processing unit 120 in FIG. 1 may perform step 1010.

At 1012, the apparatus may divide the one or more video frames into at least one sub-area associated with color data or at least one other sub-area associated with the application data, as described in connection with the examples in FIGS. 2-8. For example, server 802 may divide the one or more video frames into at least one sub-area associated with color data or at least one other sub-area associated with the application data, as described in 842 of FIG. 8. Further, processing unit 120 in FIG. 1 may perform step 1012.

At 1014, the apparatus may transmit the encoded application data for the at least one frame, as described in connection with the examples in FIGS. 2-8. For example, server 802 may transmit the encoded application data for the at least one frame, as described in 850 of FIG. 8. Further, processing unit 120 in FIG. 1 may perform step 1014. The application data may be red (R), green (G), blue (B) (RGB) color data before being converted, and the application data may be luminance (Y) chrominance (UV) (YUV) color data after being encoded.

Figure 11:
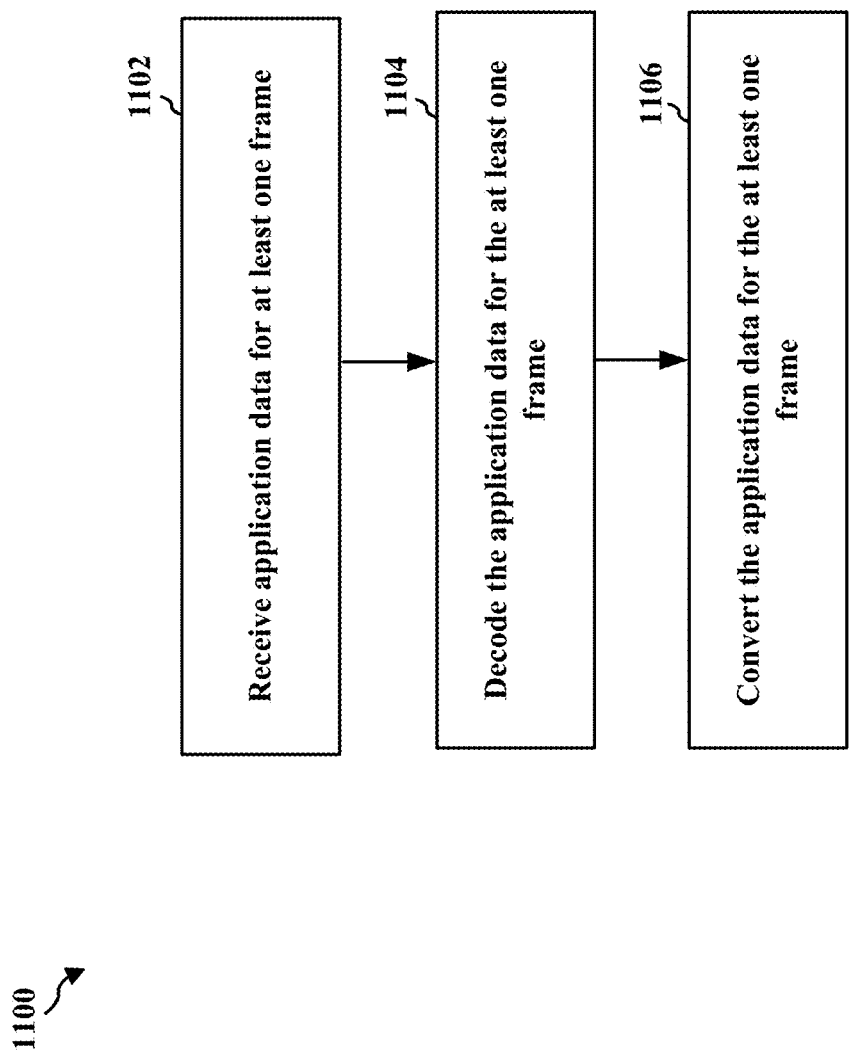
FIG. 11 illustrates an example flowchart of an example method in accordance with one or more techniques of this disclosure.

FIG. 11 illustrates an example flowchart 1100 of an example method in accordance with one or more techniques of this disclosure. The method may be performed by an apparatus such as a server, a client device, a CPU, a GPU, or an apparatus for graphics processing.

At 1102, the apparatus may receive application data for at least one frame, the application data being associated with a data stream, as described in connection with the examples in FIGS. 2-8. For example, client device 804 may receive application data for at least one frame, the application data being associated with a data stream, as described in 860 of FIG. 8. Further, processing unit 120 in FIG. 1 may perform step 1102. The application data may correspond to a group of values or a multi-variate function. Also, the application data may be associated with a subset of the at least one frame. The data stream may be a moving picture experts group (MPEG) stream.

At 1104, the apparatus may decode the application data for the at least one frame, the application data being decoded via a video decoding process, as described in connection with the examples in FIGS. 2-8. For example, client device 804 may decode the application data for the at least one frame, the application data being decoded via a video decoding process, as described in 870 of FIG. 8. Further, processing unit 120 in FIG. 1 may perform step 1104. In some aspects, decoding the application data for the at least one frame may include reverse subsampling the application data for the at least one frame, e.g., the apparatus may reverse subsample the application data for the at least one frame. The application data may be reverse subsampled based on one or more subsampled channels, where at least one of the one or more subsampled channels may be a luminance (Y) chrominance (UV) (YUV) channel. The video decoding process may include moving picture experts group (MPEG) decoding.

In some aspects, the decoded application data may be allocated for one or more video frames. Also, the decoded application data may be stored in the one or more video frames. The decoded application data may be block-wise allocated or may be parallel block allocated for the one or more video frames. The one or more video frames may be divided into at least one sub-area associated with color data or at least one other sub-area associated with the application data.

At 1106, the apparatus may convert the application data for the at least one frame, the converted application data corresponding to one or more image functions or one or more data channels, as described in connection with the examples in FIGS. 2-8. For example, client device 804 may convert the application data for the at least one frame, the converted application data corresponding to one or more image functions or one or more data channels, as described in 880 of FIG. 8. Further, processing unit 120 in FIG. 1 may perform step 1106. The application data may be luminance (Y) chrominance (UV) (YUV) color data before being decoded, and the application data may be red (R), green (G), blue (B) (RGB) color data after being converted. The one or more image functions may correspond to one or more two-dimensional (2D) image functions. Also, each of the one or more image functions may include a plurality of pixels, and each of the plurality of pixels may include one or more function values. The one or more function values may include at least one of: one or more depth values, one or more texture values, one or more texture coordinates, one or more transparency values, one or more screen masks, one or more normal vectors, one or more primitive identifiers (IDs), one or more global coordinate positions, or one or more displacement maps.

Figure 12:
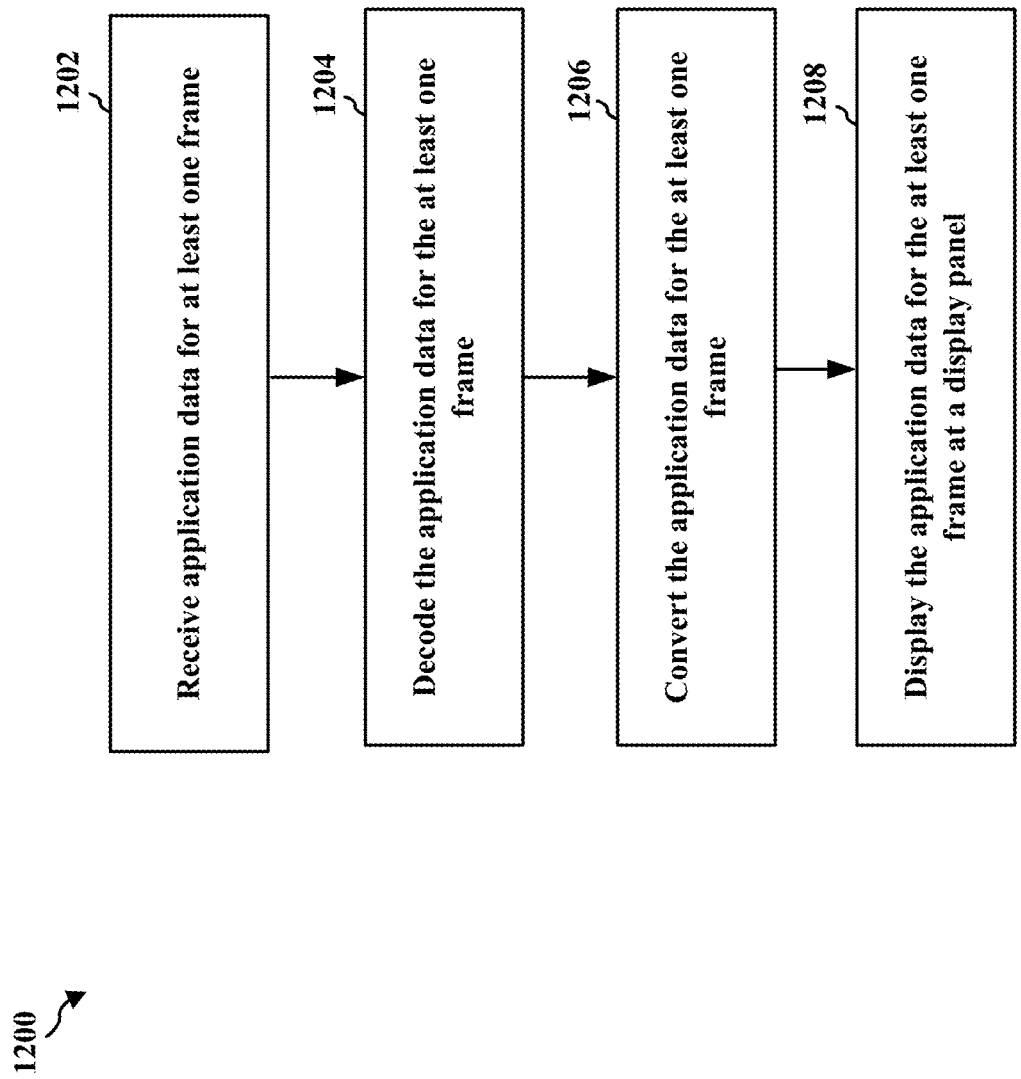
FIG. 12 illustrates an example flowchart of an example method in accordance with one or more techniques of this disclosure.

FIG. 12 illustrates an example flowchart 1200 of an example method in accordance with one or more techniques of this disclosure. The method may be performed by an apparatus such as a server, a client device, a CPU, a GPU, or an apparatus for graphics processing.

At 1202, the apparatus may receive application data for at least one frame, the application data being associated with a data stream, as described in connection with the examples in FIGS. 2-8. For example, client device 804 may receive application data for at least one frame, the application data being associated with a data stream, as described in 860 of FIG. 8. Further, processing unit 120 in FIG. 1 may perform step 1202. The application data may correspond to a group of values or a multi-variate function. Also, the application data may be associated with a subset of the at least one frame. The data stream may be a moving picture experts group (MPEG) stream.

At 1204, the apparatus may decode the application data for the at least one frame, the application data being decoded via a video decoding process, as described in connection with the examples in FIGS. 2-8. For example, client device 804 may decode the application data for the at least one frame, the application data being decoded via a video decoding process, as described in 870 of FIG. 8. Further, processing unit 120 in FIG. 1 may perform step 1204. In some aspects, decoding the application data for the at least one frame may include reverse subsampling the application data for the at least one frame, e.g., the apparatus may reverse subsample the application data for the at least one frame. The application data may be reverse subsampled based on one or more subsampled channels, where at least one of the one or more subsampled channels may be a luminance (Y) chrominance (UV) (YUV) channel. The video decoding process may include moving picture experts group (MPEG) decoding.

In some aspects, the decoded application data may be allocated for one or more video frames. Also, the decoded application data may be stored in the one or more video frames. The decoded application data may be block-wise allocated or may be parallel block allocated for the one or more video frames. The one or more video frames may be divided into at least one sub-area associated with color data or at least one other sub-area associated with the application data.

At 1206, the apparatus may convert the application data for the at least one frame, the converted application data corresponding to one or more image functions or one or more data channels, as described in connection with the examples in FIGS. 2-8. For example, client device 804 may convert the application data for the at least one frame, the converted application data corresponding to one or more image functions or one or more data channels, as described in 880 of FIG. 8. Further, processing unit 120 in FIG. 1 may perform step 1206. The application data may be luminance (Y) chrominance (UV) (YUV) color data before being decoded, and the application data may be red (R), green (G), blue (B) (RGB) color data after being converted. The one or more image functions may correspond to one or more two-dimensional (2D) image functions. Also, each of the one or more image functions may include a plurality of pixels, and each of the plurality of pixels may include one or more function values. The one or more function values may include at least one of: one or more depth values, one or more texture values, one or more texture coordinates, one or more transparency values, one or more screen masks, one or more normal vectors, one or more primitive identifiers (IDs), one or more global coordinate positions, or one or more displacement maps.

At 1208, the apparatus may display the application data for the at least one frame at a display panel, as described in connection with the examples in FIGS. 2-8. For example, client device 804 may display the application data for the at least one frame at a display panel, as described in 890 of FIG. 8. Further, processing unit 120 in FIG. 1 may perform step 1208.

In one configuration, a method or apparatus for graphics processing is provided. The apparatus may be a server, a client device, a CPU, a GPU, or some other processor that may perform graphics processing. In one aspect, the apparatus may be the processing unit 120 within the device 104, or may be some other hardware within device 104 or another device. The apparatus, e.g., processing unit 120, may include means for converting application data for at least one frame, the application data corresponding to one or more image functions or one or more data channels; means for encoding the application data for the at least one frame, the application data being associated with a data stream, the application data being encoded via a video encoding process; means for transmitting the encoded application data for the at least one frame; means for allocating the encoded application data to one or more video frames or one or more MPEG frames; means for storing the encoded application data in the one or more video frames or the one or more MPEG frames; means for dividing the one or more video frames into at least one sub-area associated with color data or at least one other sub-area associated with the application data; and means for generating the application data for the at least one frame. The apparatus, e.g., processing unit 120, may also include means for receiving application data for at least one frame, the application data being associated with a data stream; means for decoding the application data for the at least one frame, the application data being decoded via a video decoding process; means for converting the application data for the at least one frame, the converted application data corresponding to one or more image functions or one or more data channels; and means for displaying the application data for the at least one frame at a display panel.

The subject matter described herein may be implemented to realize one or more benefits or advantages. For instance, the described graphics processing techniques may be used by a server, a client, a GPU, a CPU, or some other processor that may perform graphics processing to implement the split rendering techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize a split rendering process that may utilize image-space function transmission through streaming video.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the claims.

The following aspects are illustrative only and may be combined with other aspects or teachings described herein, without limitation.

Aspect 1 is an apparatus for graphics processing at a server including at least one processor coupled to a memory and configured to: convert application data for at least one frame, the application data corresponding to one or more image functions or one or more data channels; encode the application data for the at least one frame, the application data being associated with a data stream, the application data being encoded via a video encoding process; and transmit the encoded application data for the at least one frame.

Aspect 2 is the apparatus of aspect 1, where to encode the application data for the at least one frame, the at least one processor is configured to subsample the application data for the at least one frame.

Aspect 3 is the apparatus of any of aspects 1 and 2, where the application data is subsampled based on one or more subsampled channels, at least one of the one or more subsampled channels being a luminance (Y) chrominance (UV) (YUV) channel.

Aspect 4 is the apparatus of any of aspects 1 to 3, where the data stream is a moving picture experts group (MPEG) stream or a video stream.

Aspect 5 is the apparatus of any of aspects 1 to 4, where the at least one processor is further configured to: allocate the encoded application data to one or more video frames or one or more MPEG frames.

Aspect 6 is the apparatus of any of aspects 1 to 5, where the at least one processor is further configured to: store the encoded application data in the one or more video frames or the one or more MPEG frames.

Aspect 7 is the apparatus of any of aspects 1 to 6, where the encoded application data is block-wise allocated or parallel block allocated for the one or more video frames.

Aspect 8 is the apparatus of any of aspects 1 to 7, where the at least one processor is further configured to: divide the one or more video frames into at least one sub-area associated with color data or at least one other sub-area associated with the application data.

Aspect 9 is the apparatus of any of aspects 1 to 8, where the application data corresponds to a group of values or a multi-variate function.

Aspect 10 is the apparatus of any of aspects 1 to 9, where the application data is red (R), green (G), blue (B) (RGB) color data before being converted, and where the application data is luminance (Y) chrominance (UV) (YUV) color data after being encoded.

Aspect 11 is the apparatus of any of aspects 1 to 10, where the application data is associated with a subset of the at least one frame.

Aspect 12 is the apparatus of any of aspects 1 to 11, where the at least one processor is further configured to: generate the application data for the at least one frame.

Aspect 13 is the apparatus of any of aspects 1 to 12, where to generate the application data for the at least one frame, the at least one processor is configured to render the application data for the at least one frame.

Aspect 14 is the apparatus of any of aspects 1 to 13, where the video encoding process includes moving picture experts group (MPEG) encoding.

Aspect 15 is the apparatus of any of aspects 1 to 14, further including a transceiver coupled to the at least one processor, where the one or more image functions correspond to one or more two-dimensional (2D) image functions.

Aspect 16 is the apparatus of any of aspects 1 to 15, where each of the one or more image functions include a plurality of pixels, and where each of the plurality of pixels includes one or more function values.

Aspect 17 is the apparatus of any of aspects 1 to 16, where the one or more function values include at least one of: one or more depth values, one or more texture one or more values, texture coordinates, one or more transparency values, one or more screen masks, one or more normal vectors, one or more primitive identifiers (IDs), one or more global coordinate positions, or one or more displacement maps.

Aspect 18 is an apparatus for graphics processing at a client device including at least one processor coupled to a memory and configured to: receive application data for at least one frame, the application data being associated with a data stream; decode the application data for the at least one frame, the application data being decoded via a video decoding process; and convert the application data for the at least one frame, the converted application data corresponding to one or more image functions or one or more data channels.

Aspect 19 is the apparatus of aspect 18, where to decode the application data for the at least one frame, the at least one processor is configured to reverse subsample the application data for the at least one frame.

Aspect 20 is the apparatus of any of aspects 18 and 19, where the application data is reverse subsampled based on one or more subsampled channels, at least one of the one or more subsampled channels being a luminance (Y) chrominance (UV) (YUV) channel.

Aspect 21 is the apparatus of any of aspects 18 to 20, where the data stream is a moving picture experts group (MPEG) stream.

Aspect 22 is the apparatus of any of aspects 18 to 21, where the decoded application data is allocated for one or more video frames.

Aspect 23 is the apparatus of any of aspects 18 to 22, where the decoded application data is stored in the one or more video frames.

Aspect 24 is the apparatus of any of aspects 18 to 23, where the decoded application data is block-wise allocated or parallel block allocated for the one or more video frames.

Aspect 25 is the apparatus of any of aspects 18 to 24, where the one or more video frames are divided into at least one sub-area associated with color data or at least one other sub-area associated with the application data.

Aspect 26 is the apparatus of any of aspects 18 to 25, where the application data corresponds to a group of values or a multi-variate function.

Aspect 27 is the apparatus of any of aspects 18 to 26, where the application data is luminance (Y) chrominance (UV) (YUV) color data before being decoded, and where the application data is red (R), green (G), blue (B) (RGB) color data after being converted.

Aspect 28 is the apparatus of any of aspects 18 to 27, where the application data is associated with a subset of the at least one frame.

Aspect 29 is the apparatus of any of aspects 18 to 28, where the at least one processor is further configured to: display the application data for the at least one frame at a display panel.

Aspect 30 is the apparatus of any of aspects 18 to 29, where the video decoding process includes moving picture experts group (MPEG) decoding.

Aspect 31 is the apparatus of any of aspects 18 to 30, further including a transceiver coupled to the at least one processor, where the one or more image functions correspond to one or more two-dimensional (2D) image functions.

Aspect 32 is the apparatus of any of aspects 18 to 31, where each of the one or more image functions include a plurality of pixels, and where each of the plurality of pixels includes one or more function values.

Aspect 33 is the apparatus of any of aspects 18 to 32, where the one or more function values include at least one of: one or more depth values, one or more texture values, one or more texture coordinates, one or more transparency values, one or more screen masks, one or more normal vectors, one or more primitive identifiers (IDs), one or more global coordinate positions, or one or more displacement maps.

Aspect 34 is a method of wireless communication for implementing any of aspects 1 to 33.

Aspect 35 is an apparatus for wireless communication including means for implementing any of aspects 1 to 33.

Aspect 36 is a computer-readable medium storing computer executable code, where the code when executed by a processor causes the processor to implement any of aspects 1 to 33.

What is claimed is:

1. An apparatus for graphics processing at a server, comprising:
    a memory; and
    at least one processor coupled to the memory and configured to:
    convert application data for at least one frame, the application data corresponding to one or more image functions or one or more data channels;
    encode the application data for the at least one frame, the application data being associated with a data stream, the application data being encoded via a video encoding process; and
    transmit the encoded application data for the at least one frame,
    wherein to encode the application data for the at least one frame, the at least one processor is configured to subsample the application data for the at least one frame,
    wherein the application data is subsampled based on one or more subsampled channels, at least one of the one or more subsampled channels being a luminance (Y) chrominance (UV) (YUV) channel,
    wherein the at least one processor is further configured to allocate the encoded application data to one or more video frames or one or more MPEG frames,
    wherein the encoded application data is block-wise allocated or parallel block allocated in a texture atlas for the one or more video frames, and
    wherein the video encoding process includes encoding an auxiliary channel as a compact YUV layout, converting the YUV layout to an auxiliary red (R), green (G), blue (B) (RGB) representation, and interleaving the auxiliary RGB representation with RGB data for MPEG encoding.

2. The apparatus of claim 1, wherein the data stream is a moving picture experts group (MPEG) stream or a video stream.

3. The apparatus of claim 1, wherein the at least one processor is further configured to:
    store the encoded application data in the one or more video frames or the one or more MPEG frames.

4. The apparatus of claim 1, wherein the at least one processor is further configured to:
    divide the one or more video frames into at least one sub-area associated with color data or at least one other sub-area associated with the application data.

5. The apparatus of claim 1, wherein the application data corresponds to a group of values or a multi-variate function.

6. The apparatus of claim 1, wherein the application data is associated with a subset of the at least one frame.

7. The apparatus of claim 1, wherein the at least one processor is further configured to:
    generate the application data for the at least one frame.

8. The apparatus of claim 7, wherein to generate the application data for the at least one frame, the at least one processor is configured to render the application data for the at least one frame.

9. The apparatus of claim 1, further comprising a transceiver coupled to the at least one processor, wherein the one or more image functions correspond to one or more two-dimensional (2D) image functions.

10. The apparatus of claim 1, wherein each of the one or more image functions include a plurality of pixels, and wherein each of the plurality of pixels includes one or more function values.

11. The apparatus of claim 10, wherein the one or more function values include at least one of: one or more depth values, one or more texture one or more values, texture coordinates, one or more transparency values, one or more screen masks, one or more normal vectors, one or more primitive identifiers (IDs), one or more global coordinate positions, or one or more displacement maps.

12. An apparatus for graphics processing at a client device, comprising:
    a memory; and
    at least one processor coupled to the memory and configured to:
    receive application data for at least one frame, the application data being associated with a data stream;
    decode the application data for the at least one frame, the application data being decoded via a video decoding process; and
    convert the application data for the at least one frame, the converted application data corresponding to one or more image functions or one or more data channels,
    wherein to decode the application data for the at least one frame, the at least one processor is configured to reverse subsample the application data for the at least one frame,
    wherein the application data is reverse subsampled based on one or more subsampled channels, at least one of the one or more sub sampled channels being a luminance (Y) chrominance (UV) (YUV) channel,
    wherein the decoded application data is allocated for one or more video frames,
    wherein the decoded application data is block-wise allocated or parallel block allocated in a texture atlas for the one or more video frames, and
    wherein the video decoding process includes decoding an MPEG frame to extract auxiliary red (R), green (G), blue (B) (RGB) representation from RGB data, converting the auxiliary RGB representation to a YUV layout, and re-assembling an auxiliary channel from the YUV layout.

13. The apparatus of claim 12, wherein the data stream is a moving picture experts group (MPEG) stream.

14. The apparatus of claim 12, wherein the decoded application data is stored in the one or more video frames.

15. The apparatus of claim 12, wherein the one or more video frames are divided into at least one sub-area associated with color data or at least one other sub-area associated with the application data.

16. The apparatus of claim 12, wherein the application data corresponds to a group of values or a multi-variate function.

17. The apparatus of claim 12, wherein the application data is associated with a subset of the at least one frame.

18. The apparatus of claim 12, wherein the at least one processor is further configured to:
display the application data for the at least one frame at a display panel.

19. The apparatus of claim 12, further comprising a transceiver coupled to the at least one processor, wherein the one or more image functions correspond to one or more two-dimensional (2D) image functions.

20. The apparatus of claim 12, wherein each of the one or more image functions include a plurality of pixels, and wherein each of the plurality of pixels includes one or more function values.

21. The apparatus of claim 20, wherein the one or more function values include at least one of: one or more depth values, one or more texture values, one or more texture coordinates, one or more transparency values, one or more screen masks, one or more normal vectors, one or more primitive identifiers (IDs), one or more global coordinate positions, or one or more displacement maps.

22. A method of graphics processing at a server, comprising:
converting application data for at least one frame, the application data corresponding to one or more image functions or one or more data channels;
encoding the application data for the at least one frame, the application data being associated with a data stream, the application data being encoded via a video encoding process;
transmitting the encoded application data for the at least one frame; and
allocating the encoded application data to one or more video frames or one or more MPEG frames,
wherein the encoding the application data for the at least one frame includes subsampling the application data for the at least one frame,
wherein the application data is subsampled based on one or more subsampled channels, at least one of the one or more subsampled channels being a luminance (Y) chrominance (UV) (YUV) channel,
wherein the encoded application data is block-wise allocated or parallel block allocated in a texture atlas for the one or more video frames, and
wherein the video encoding process includes encoding an auxiliary channel as a compact YUV layout, converting the YUV layout to an auxiliary red (R), green (G), blue (B) (RGB) representation, and interleaving the auxiliary RGB representation with RGB data for MPEG encoding.

23. A method of graphics processing at a client device, comprising:
receiving application data for at least one frame, the application data being associated with a data stream;
decoding the application data for the at least one frame, the application data being decoded via a video decoding process; and
converting the application data for the at least one frame, the converted application data corresponding to one or more image functions or one or more data channels,
wherein the decoding the application data for the at least one frame includes reverse subsampling the application data for the at least one frame,
wherein the application data is reverse subsampled based on one or more subsampled channels, at least one of the one or more subsampled channels being a luminance (Y) chrominance (UV) (YUV) channel,
wherein the decoded application data is allocated for one or more video frames,
wherein the decoded application data is block-wise allocated or parallel block allocated in a texture atlas for the one or more video frames, and
wherein the video decoding process includes decoding an MPEG frame to extract auxiliary red (R), green (G), blue (B) (RGB) representation from RGB data, converting the auxiliary RGB representation to a YUV layout, and re-assembling an auxiliary channel from the YUV layout.

\* \* \* \* \*